(12) United States Patent
Bushey

(10) Patent No.: US 8,731,165 B2
(45) Date of Patent: *May 20, 2014

(54) SYSTEM AND METHOD OF AUTOMATED ORDER STATUS RETRIEVAL

(71) Applicant: AT&T Intellectual Property I, L.P., Austin, TX (US)

(72) Inventor: Robert R. Bushey, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,950

(22) Filed: Apr. 15, 2013

(65) Prior Publication Data

US 2013/0230162 A1  Sep. 5, 2013

Related U.S. Application Data

(63) Continuation of application No. 11/173,227, filed on Jul. 1, 2005, now Pat. No. 8,503,641.

(51) Int. Cl.
*H04M 3/42* (2006.01)
*H04M 3/00* (2006.01)
*H04M 5/00* (2006.01)
*H04M 11/00* (2006.01)

(52) U.S. Cl.
USPC ............... 379/201.01; 379/93.12; 379/265.01

(58) Field of Classification Search
USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 26, 6.02, 266.03, 379/266.04, 266.05, 266.06, 266.07, 379/266.08, 266.09, 266.1; 705/26.8, 26.9, 705/304

See application file for complete search history.

(56) References Cited

U.S. PATENT DOCUMENTS

| | | | |
|---|---|---|---|
| 4,953,204 A | 8/1990 | Cuschleg, Jr. et al. | |
| 4,967,405 A | 10/1990 | Upp et al. | |
| 4,975,841 A | 12/1990 | Kehnemuyi et al. | |
| 5,335,269 A | 8/1994 | Steinlicht | |

(Continued)

FOREIGN PATENT DOCUMENTS

| | | |
|---|---|---|
| EP | 0424015 A2 | 4/1991 |
| EP | 0424015 A3 | 4/1991 |

(Continued)

OTHER PUBLICATIONS

Supplementary European Search Report, EP 0876652 A4, Apr. 14, 1999, 26 pages.

(Continued)

*Primary Examiner* — Khai N Nguyen
(74) *Attorney, Agent, or Firm* — Toler Law Group, PC

(57) ABSTRACT

A computer-readable storage device stores instructions that, when executed by a processor, cause the processor to perform operations including prompting a caller during a call for an order identifier. The order identifier identifies a pending order. The operations also include prompting the caller to provide a reason for the call. The operations further include transferring the call to an automated check order status system in response to receiving an indication that the reason for the call is to obtain an order status associated with the pending order. The operations also include, in response to receiving an indication that the order status is not locatable, automatically transferring the call to a customer service agent.

20 Claims, 2 Drawing Sheets

(56) References Cited

U.S. PATENT DOCUMENTS

| | | |
|---|---|---|
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,530,848 A | 6/1996 | Gilbert et al. |
| 5,555,299 A | 9/1996 | Maloney et al. |
| 5,590,186 A | 12/1996 | Liao et al. |
| 5,652,789 A | 7/1997 | Miner et al. |
| 5,754,639 A | 5/1998 | Flockhart et al. |
| 5,754,978 A | 5/1998 | Perez-Mendez et al. |
| 5,867,562 A * | 2/1999 | Scherer .................. 379/88.21 |
| 5,867,817 A | 2/1999 | Catallo et al. |
| 5,923,745 A | 7/1999 | Hurd |
| 5,937,051 A | 8/1999 | Hurd et al. |
| 5,940,476 A * | 8/1999 | Morganstein et al. ..... 379/88.02 |
| 5,946,388 A | 8/1999 | Walker et al. |
| 5,953,704 A | 9/1999 | McIlroy et al. |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,049,594 A | 4/2000 | Furman et al. |
| 6,067,357 A * | 5/2000 | Kishinsky et al. ....... 379/265.02 |
| 6,104,798 A | 8/2000 | Lickiss et al. |
| 6,118,866 A | 9/2000 | Shtivelman |
| 6,119,101 A | 9/2000 | Peckover |
| 6,173,266 B1 | 1/2001 | Marx et al. |
| 6,173,289 B1 | 1/2001 | Sonderegger et al. |
| 6,173,399 B1 | 1/2001 | Gilbrech et al. |
| 6,175,621 B1 | 1/2001 | Begeja |
| 6,259,786 B1 | 7/2001 | Gisby |
| 6,269,153 B1 | 7/2001 | Carpenter et al. |
| 6,317,439 B1 | 11/2001 | Cardona et al. |
| 6,333,980 B1 | 12/2001 | Hollatz et al. |
| 6,353,608 B1 | 3/2002 | Cullers et al. |
| 6,366,658 B1 | 4/2002 | Bjornberg et al. |
| 6,366,668 B1 | 4/2002 | Borst et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,414,966 B1 | 7/2002 | Kulkarni et al. |
| 6,418,424 B1 | 7/2002 | Hoffberg et al. |
| 6,442,247 B1 | 8/2002 | Garcia |
| 6,510,414 B1 | 1/2003 | Chaves et al. |
| 6,519,562 B1 | 2/2003 | Phillips et al. |
| 6,529,871 B1 | 3/2003 | Kanevsky et al. |
| 6,553,113 B1 | 4/2003 | Dhir et al. |
| 6,570,967 B2 | 5/2003 | Katz |
| 6,584,180 B2 | 6/2003 | Nemoto |
| 6,587,556 B1 | 7/2003 | Judkins et al. |
| 6,598,136 B1 | 7/2003 | Norrod et al. |
| 6,600,736 B1 | 7/2003 | Ball et al. |
| 6,603,854 B1 | 8/2003 | Judkins et al. |
| 6,614,781 B1 | 9/2003 | Elliott et al. |
| 6,631,186 B1 | 10/2003 | Adams et al. |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,460 B2 | 2/2004 | Knott et al. |
| 6,700,972 B1 | 3/2004 | McHugh et al. |
| 6,704,404 B1 | 3/2004 | Burnett |
| 6,707,789 B1 | 3/2004 | Arslan et al. |
| 6,714,631 B1 | 3/2004 | Martin et al. |
| 6,721,416 B1 | 4/2004 | Farrell |
| 6,731,722 B2 | 5/2004 | Coffey |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,757,306 B1 | 6/2004 | Klish, II et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,853,722 B2 | 2/2005 | Joseph et al. |
| 6,853,966 B2 | 2/2005 | Bushey et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,895,083 B1 | 5/2005 | Bers et al. |
| 6,901,366 B1 | 5/2005 | Kuhn et al. |
| 6,907,119 B2 | 6/2005 | Case et al. |
| 6,915,246 B2 | 7/2005 | Gusler et al. |
| 6,963,983 B2 | 11/2005 | Munson et al. |
| 7,006,605 B1 * | 2/2006 | Morganstein et al. ..... 379/88.02 |
| 7,242,751 B2 | 7/2007 | Bushey et al. |
| 7,450,698 B2 | 11/2008 | Bushey et al. |
| 7,580,837 B2 | 8/2009 | Bushey et al. |
| 7,602,898 B2 | 10/2009 | Klein et al. |
| 7,627,096 B2 | 12/2009 | Bushey et al. |
| 7,636,432 B2 | 12/2009 | Bushey et al. |
| 7,657,005 B2 | 2/2010 | Chang |
| 7,668,889 B2 | 2/2010 | Edwards et al. |
| 7,684,989 B1 * | 3/2010 | Collins et al. .............. 704/270.1 |
| 7,724,889 B2 | 5/2010 | Bushey et al. |
| 7,751,551 B2 | 7/2010 | Bushey et al. |
| 7,864,942 B2 | 1/2011 | Knott et al. |
| 7,933,399 B2 | 4/2011 | Knott et al. |
| 7,936,861 B2 | 5/2011 | Knott et al. |
| 8,005,204 B2 | 8/2011 | Bushey et al. |
| 8,130,936 B2 | 3/2012 | Kortum et al. |
| 8,165,281 B2 | 4/2012 | Joseph et al. |
| 8,175,253 B2 | 5/2012 | Knott et al. |
| 8,223,954 B2 | 7/2012 | Dallessandro et al. |
| 2001/0011211 A1 | 8/2001 | Bushey et al. |
| 2001/0018672 A1 | 8/2001 | Petters et al. |
| 2001/0021948 A1 | 9/2001 | Khouri et al. |
| 2001/0032229 A1 | 10/2001 | Hulls et al. |
| 2001/0034662 A1 | 10/2001 | Morris |
| 2002/0016757 A1 * | 2/2002 | Johnson et al. .................. 705/36 |
| 2002/0026394 A1 * | 2/2002 | Savage et al. .................... 705/34 |
| 2002/0046030 A1 | 4/2002 | Haritsa et al. |
| 2002/0056000 A1 * | 5/2002 | Albert Coussement ...... 709/225 |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0067714 A1 | 6/2002 | Crain et al. |
| 2002/0087385 A1 | 7/2002 | Vincent |
| 2002/0087558 A1 * | 7/2002 | Bailey et al. ..................... 707/10 |
| 2002/0091617 A1 * | 7/2002 | Keith .............................. 705/37 |
| 2002/0114432 A1 | 8/2002 | Shaffer et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0156699 A1 | 10/2002 | Gray et al. |
| 2002/0165732 A1 | 11/2002 | Ezzeddine et al. |
| 2002/0196277 A1 | 12/2002 | Bushey et al. |
| 2003/0014335 A1 * | 1/2003 | Lecheler-Moore et al. .... 705/30 |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 | 5/2003 | Afkhami et al. |
| 2003/0103619 A1 | 6/2003 | Brown et al. |
| 2003/0114105 A1 | 6/2003 | Haller et al. |
| 2003/0118159 A1 | 6/2003 | Shen et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0149653 A1 * | 8/2003 | Penney et al. ................... 705/37 |
| 2003/0156133 A1 | 8/2003 | Martin et al. |

(56) References Cited

U.S. PATENT DOCUMENTS

| | | |
|---|---|---|
| 2003/0165223 A1 | 9/2003 | Timmins et al. |
| 2003/0187732 A1 | 10/2003 | Seta |
| 2003/0187773 A1 | 10/2003 | Santos et al. |
| 2003/0187865 A1 | 10/2003 | Frisina |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0228007 A1 | 12/2003 | Kurosaki |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015256 A1* | 1/2005 | Kargman ................... 704/272 |
| 2005/0015744 A1 | 1/2005 | Bushey et al. |
| 2005/0021567 A1* | 1/2005 | Holenstein et al. ........... 707/200 |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0049940 A1* | 3/2005 | Tengler et al. .................. 705/27 |
| 2005/0055216 A1 | 3/2005 | Bushey et al. |
| 2005/0055599 A1* | 3/2005 | Bravo et al. ...................... 714/4 |
| 2005/0058264 A1 | 3/2005 | Joseph et al. |
| 2005/0060200 A1* | 3/2005 | Kobylevsky et al. ............. 705/2 |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0097034 A1* | 5/2005 | Loeger et al. ................... 705/39 |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0141694 A1* | 6/2005 | Wengrovitz ............. 379/265.09 |
| 2005/0169441 A1 | 8/2005 | Yacoub et al. |
| 2005/0169449 A1* | 8/2005 | Coughlin et al. ........ 379/201.12 |
| 2005/0169453 A1 | 8/2005 | Knott et al. |
| 2005/0201547 A1 | 9/2005 | Burg et al. |
| 2005/0240411 A1 | 10/2005 | Yacoub |
| 2006/0026049 A1 | 2/2006 | Joseph et al. |
| 2006/0050865 A1 | 3/2006 | Kortum et al. |
| 2006/0062375 A1 | 3/2006 | Pasquale et al. |
| 2006/0109974 A1 | 5/2006 | Paden et al. |
| 2006/0126808 A1 | 6/2006 | Dallessandro et al. |
| 2006/0126811 A1 | 6/2006 | Bushey et al. |
| 2006/0188087 A1 | 8/2006 | Kortum et al. |
| 2007/0047718 A1 | 3/2007 | Idler et al. |
| 2007/0192362 A1* | 8/2007 | Caballero et al. .......... 707/104.1 |

FOREIGN PATENT DOCUMENTS

| | | |
|---|---|---|
| EP | 0424015 B1 | 3/1996 |
| WO | 9726612 A1 | 7/1997 |
| WO | 0137539 A2 | 5/2001 |
| WO | 0137539 A3 | 5/2001 |
| WO | 2004017584 A1 | 2/2004 |
| WO | 2004049222 A2 | 6/2004 |

OTHER PUBLICATIONS

Ogino, Tsukasa, et al., "Technologies for Internet Infrastructure: Eliminating the World Wide Wait," iNet Japan, Jul. 18-21, 2000, http://www.isoc.org/inet2000/cdproceedings/1g/index.htm, 19 pages.

* cited by examiner

SYSTEM AND METHOD OF AUTOMATED ORDER STATUS RETRIEVAL

CLAIM OF PRIORITY

This application claims priority from, and is a continuation of, U.S. patent application Ser. No. 11/173,227, filed on Jul. 1, 2005, now U.S. Pat. No. 8,503,641, and entitled "SYSTEM AND METHOD OF AUTOMATED ORDER STATUS RETRIEVAL", which is hereby incorporated in its entirety.

FIELD OF THE DISCLOSURE

The present disclosure relates generally to call centers.

BACKGROUND

Many goods and services are purchased via telephone. For example, a customer wishing to purchase direct subscriber line (DSL) service from a telecommunication company can call a customer service agent at a call center associated with the telecommunication company and order DSL service for a business or residence. While the order is pending, the customer may want to know the order status of the order. As such, the customer has to, again, call a customer service agent in order to determine the order status of the order. Employing customer service agents to handle order status calls can be quite expensive.

Accordingly, there is a need for an improved system and method of providing order status via a telephone.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION OF THE DRAWINGS

A method of managing telephone calls is disclosed and includes receiving a telephone call from a caller, prompting the caller to provide a reason for the telephone call, and transferring the telephone call to an automated enterprise check order status system when check order status is indicated as the reason for the telephone call.

In a particular embodiment, the method includes prompting the caller for an order identifier. The order identifier can be a telephone number, an account number, or an order number. In another particular embodiment, the method includes receiving the order identifier. In still another particular embodiment, the order identifier is received via a series of touch tones and the order identifier is associated with a previously order telephone service.

In yet another particular embodiment, the method also includes verifying the order identifier. Additionally, the method includes determining whether an order status associated with the order identifier is available. Moreover, the method includes retrieving the order status from a database and providing the order status to the caller.

In another particular embodiment, the method includes transferring the telephone call to a customer service agent when check order status is not indicated as the reason for the call. Further, the method includes transferring the telephone call to a customer service agent when the order identifier is incorrect. Also, the method includes transferring the telephone call to a customer service agent when the order status is unavailable.

In another embodiment, a call management system is disclosed and includes an automated call router and a check order status module that is coupled to the automated call router. In this embodiment, the automated call router comprises a processor, a memory that is accessible to the processor, and a computer program that is embedded within the memory. The computer program includes instructions to prompt a caller to identify a reason for a call and instructions to transfer the call to the check order status module when check order status is indicated.

In yet another embodiment, a touch-tone enterprise check order status module is disclosed and includes a processor, a memory that is accessible to the processor, and a computer program that is embedded within the memory. In this embodiment, the computer program includes instructions to prompt a caller for an order identifier. The order identifier can be a telephone number, an account number, or an order number. In this embodiment, the computer program also includes instructions to receive the order identifier via a series of touch tones and instructions to locate an order status associated with the order identifier.

Figure 1:
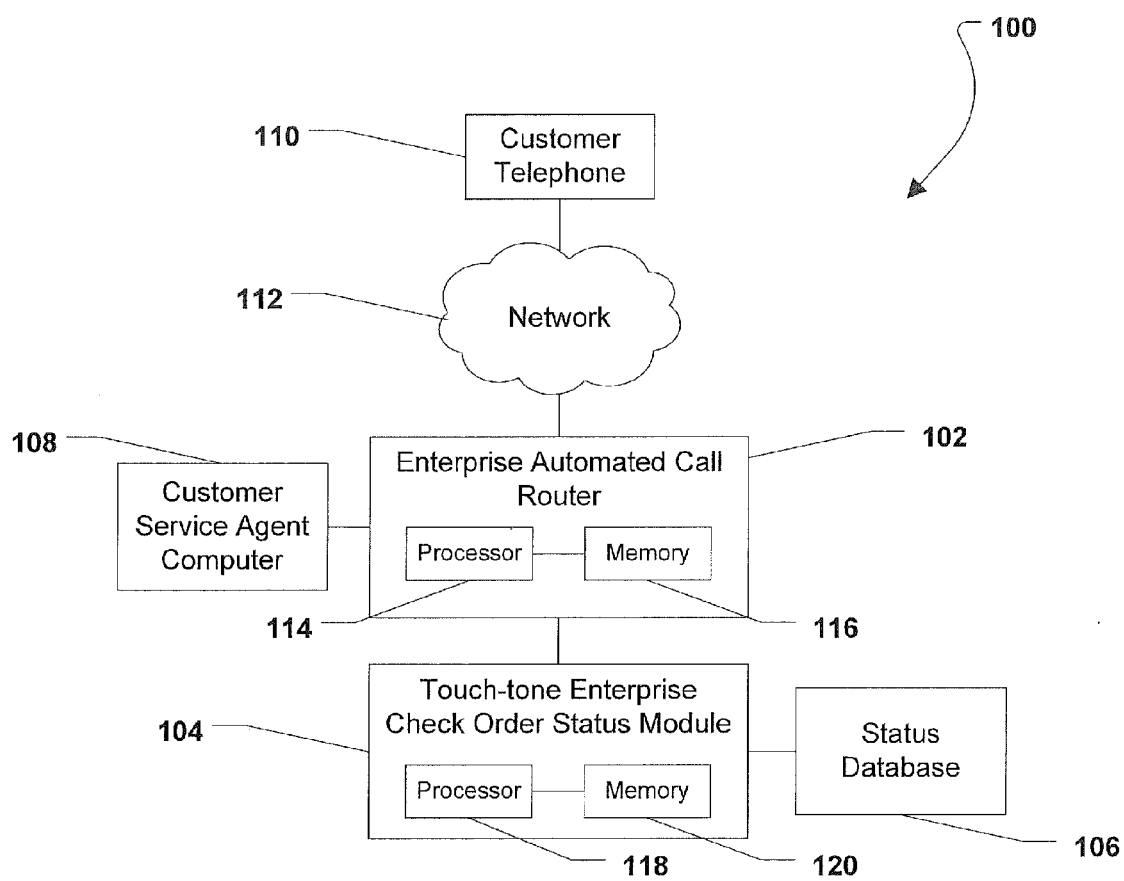
FIG. 1 is a block diagram representative of a call handling system.

Referring to FIG. 1, a system is shown and is generally designated 100. As illustrated in FIG. 1, the system 100 includes a call router 102, e.g., an enterprise automated call router (EACR). Further, the system 100 includes a touch-tone enterprise check order status (TECOS) module 104 that is coupled to the EACR. Additionally, an order status database 106 is coupled to the TECOS module 104.

FIG. 1 further indicates that a customer service agent computer 108 can be coupled to the call router 102. Moreover, a customer telephone 110 can be coupled placed calls to the call router 102 via a telephone network 112. In a particular embodiment, the telephone network 102 can be a public switched telephone network, a cellular telephone network, a mobile telephone network, a voice over Internet protocol (VoIP) telephone network, or any other telephone network that can allow a customer to use the customer telephone 110 to place a call to the call router 102.

In a particular embodiment, the call router 102 includes a processor 114 and a memory 116 that is accessible to the processor 114. Further, in a particular embodiment, the TECOS module 104 includes a processor 118 and a memory 120 that is accessible to the processor 118. The call router 102 can include a computer program that is embedded within the memory 116 and that is executable by the processor 114 in order to determine whether a caller is requesting the order status of a previously placed order. The call router 102 can determine the reason for the call by prompting the caller to speak the reasons for the call.

In a particular embodiment, the order status can include information concerning whether the order is still active and the date, or estimated date, that the order will be fulfilled. In the case that the caller is requesting the order status of an order, the call router 102 can transfer the incoming call to the TECOS module 104. The TECOS module 104 can include a program that is embedded within the memory 120 and that is executable by the processor 118 to determine the order status of a previously placed order. In a particular embodiment, a customer can interact with the program within the TECOS module 104 using the touch-tone capabilities provided by a typical telephone keypad. As such, when the TECOS module 104 receives a call from the call router 102, after the call router 102 has determined that the caller is seeking the order status of an order, the TECOS module 104 automatically knows that the caller would like to check the order status of an order and that a customer service agent has not been requested.

In a particular embodiment, after the call router 102 determines that the reason for the call is to check the order status of an order the call router 102 can set an action object in a message to the TECOS module 104 to "Check-Acquisition Status" and transmit the message to the TECOS module 104 with the call.

Figure 2:
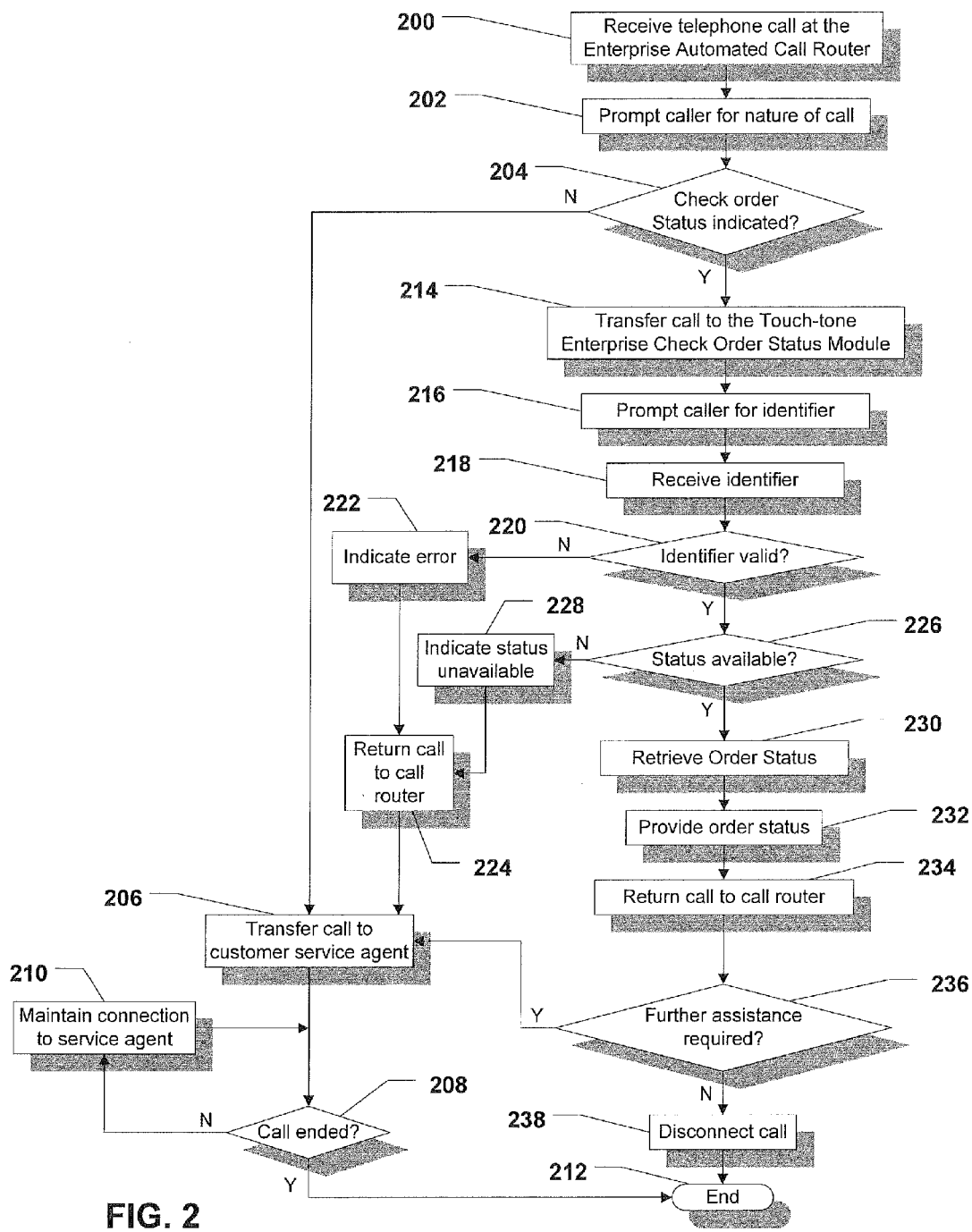
FIG. 2 is a flow chart to illustrate a method of managing telephone calls to a call center.

Referring to FIG. 2, a method of managing telephone calls is shown and commences at block 200. At block 200, a call router, e.g., the call router 102 shown in FIG. 1, receives a telephone call from a caller, such as a customer. At block 202, the call router prompts the caller for the reason for the call, e.g., using an interactive voice response (IVR) module. Moving to decision step 204, the call router 102 determines whether the caller has indicated that the reason for the call is to check the order status of an order. If check order status is not indicated, the method proceeds to block 206 and the call router 102 transfers the call to the next available customer service agent. Thereafter, at decision step 208, the call router determines whether the call has ended. If the call is not ended, the method proceeds to block 210 and the call router maintains the connection to the service agent. On the other hand, if the call is ended the method ends at state 212.

Returning to decision step 204, if a check order status is indicated by the caller, the method moves to block 214 and the call router transfers the call to a touch-tone enterprise check order status (TECOS) module that is coupled to the call router. Moving to block 216, the TECOS module prompts the caller for an order identifier. In a particular embodiment, the order identifier can be a telephone number associated with the caller, an account number associated with an order, or an order number associated with an order. Further, in a particular embodiment, the caller can input the order identifier to the TECOS module using the touch-tone interface, e.g., the keypad, that is provided by a typical telephone.

Proceeding to block 218, the TECOS module receives the order identifier from the caller. Thereafter, at decision step 220, the TECOS module determines whether the order identifier is valid by comparing the order identifier to a list of valid order identifiers within the order status database. If the order identifier is not valid, the method proceeds to block 222 and the TECOS module indicates that an error has occurred, e.g., that the order identifier is invalid or unidentifiable. Next, at block 224, the TECOS module returns the call to the call router. Then, the method proceeds to block 206 and continues as described above.

Returning to decision step 220, when a valid order identifier is received, the method proceeds to decision step 226 and the TECOS module determines whether an order status associated with the order identifier is available. In a particular embodiment, the TECOS module can determine whether the order status is available by querying an order status database using the order identifier. If the order status is not available, the method proceeds to block 228 and the TECOS module indicates to the caller that the order status is unavailable. Thereafter, the method moves to block 224 and continues as described herein.

Returning to decision step 226, if the order status is available, the method proceeds to block 230 and the TECOS module retrieves the order status from the order status database. Next, at block 232, the TECOS module provides the order status to the caller. At block 234, the TECOS module returns the caller to the call router. Thereafter, at decision step 236, the call router queries the caller to whether the caller needs further assistance. If further assistance is required, the method moves to block 206 and continues as described herein. At decision step 236, if further assistance is not required, the method continues to block 238 and the call is disconnected. The method then ends at state 212.

With the configuration of structure described above, the system and method of automated order status retrieval allows a user to call a customer service center and automatically retrieve the order status of a previously placed order, e.g., an order for a product or a service. A user can input an order identifier associated with the previously placed order using the keypad on his or her telephone. A touch-tone enterprise check order status module at a customer service center can receive the order identifier and locate the order status of the order. Once the order status is located, the order status can be transmitted to the user.

In a particular embodiment, the call router and the TECOS module are integrated such that the caller does not realize that the call is being passed between two separate and distinct self-service applications. Due to the integration, the TECOS module knows when a call comes from the call router, a customer is seeking the status of an order and that the customer has not request an agent. After the customer receives the order status, the call can be returned to the call router and the call router can know that the caller was successful in obtaining the order status. In a particular embodiment, the TECOS module is an automated self-service application. In an alternative embodiment, the TECOS module can use speech recognition interface in lieu of a touch-tone interface.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure contemplates a machine readable medium containing instructions, or that which receives and executes instructions associated with a propagated signal, so that a device connected to a network environment can send or receive voice, video or data to communicate over the network.

It will be understood that a device as specified by the present disclosure may also be directed to other electronic devices of similar functionality. For example, a device that provides voice, video or data communication may be implemented as a telephone, a cordless telephone, a mobile phone, a cellular phone, a Personal Digital Assistant (PDA) or other computer-based communication devices. As another example, set-top box functionality may be implemented by a computer and/or a server.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-readable storage device storing instructions that, when executed by a processor, cause the processor to perform operations comprising:
   prompting a caller during a call for an order identifier, wherein the order identifier identifies a pending order;
   prompting the caller to provide a reason for the call;
   transferring the call to an automated check order status system in response to receiving an indication that the reason for the call is to obtain an order status associated with the pending order; and
   selectively transferring the call to a customer service agent based on the order status, wherein the call is automatically transferred to the customer service agent in response to receiving an indication that the order status is not locatable.

2. The computer-readable storage device of claim 1, wherein the operations further comprise receiving the call.

3. The computer-readable storage device of claim 1, wherein the order identifier includes a telephone number.

4. The computer-readable storage device of claim 1, wherein the operations further comprise receiving the order identifier.

5. The computer-readable storage device of claim 4, wherein the order identifier is received via a series of touch tones.

6. The computer-readable storage device of claim 4, wherein the operations further comprise determining whether the order identifier is valid in response to receiving an indication that the reason for the call is to obtain the order status.

7. The computer-readable storage device of claim 6, wherein the operations further comprise selectively determining whether the order status is locatable based on the order identifier, wherein whether the order status is locatable is determined in response to a determination that the order identifier is valid, and wherein determining whether the order status is locatable includes querying an order status database using the order identifier.

8. The computer-readable storage device of claim 1, wherein the operations further comprise, in response to an indication that the order status is locatable, retrieving the order status from an order status database.

9. The computer-readable storage device of claim 8, wherein the operations further comprise providing the order status to the caller.

10. The computer-readable storage device of claim 6, wherein determining that the order identifier is valid includes comparing the order identifier to a plurality of valid order identifiers from an order status database and identifying a match of the order identifier to a particular one of the valid order identifiers.

11. The computer-readable storage device of claim 6, wherein the operations further comprise, in response to a determination that the order identifier is invalid, transferring the call to the customer service agent.

12. The computer-readable storage device of claim 7, wherein the order status includes an indication of a date that the pending order is scheduled to be completed.

13. A system comprising:
   a processor; and
   a memory storing instructions that, when executed by the processor, cause the processor to perform operations comprising:
      prompting a caller during a call for an order identifier identifying a pending order, wherein the order identifier includes an account number;
      prompting the caller to identify a reason associated with a call that is received by an automated call router;
      transferring the call to a check order status module in response to receiving an indication that the reason is to obtain an order status of the pending order; and
      selectively transferring the call to a customer service agent based on the order status, wherein the call is automatically transferred to the customer service agent in response to receiving an indication from the check order status module that the order status is not locatable.

14. The system of claim 13, wherein the automated call router is configured to receive the order identifier via a series of touch tones.

15. The system of claim 13, wherein the automated call router is configured to validate the order identifier.

16. The system of claim 13, wherein the automated call router is configured to determine whether the order status is locatable, wherein the determination is based on the order identifier.

17. The system of claim 13, wherein the order status includes an indication of whether the pending order is active.

18. A method comprising:
   prompting a caller during a call for an order identifier, wherein the order identifier identifies a pending order;
   receiving the order identifier via a series of touch tones;
   determining whether the order identifier is valid;
   in response to determining that the order identifier is valid, determining based on the order identifier whether an order status of the pending order is locatable; and
   selectively transferring the call to a customer service agent based on the order status, wherein the call is automatically transferred to the customer service agent in response to an indication that the order status is not locatable.

19. The method of claim 18, further comprising determining whether the order status of the pending order is locatable by querying an order status database using the order identifier.

20. The method of claim 18, wherein the pending order is associated with a communication service.

* * * * *